United States Patent
Miller et al.

(10) Patent No.: US 9,151,546 B2
(45) Date of Patent: Oct. 6, 2015

(54) HEAT EXCHANGER ASSEMBLY

(71) Applicant: General Electric Company, Schenectady, NY (US)

(72) Inventors: Drew Colin Miller, Roanoke, VA (US); Christopher Todd Moore, Troutville, VA (US)

(73) Assignee: General Electric Company, Schenectady, NY (US)

( * ) Notice: Subject to any disclaimer, the term of this patent is extended or adjusted under 35 U.S.C. 154(b) by 256 days.

(21) Appl. No.: 13/779,869

(22) Filed: Feb. 28, 2013

(65) Prior Publication Data

US 2014/0238651 A1 Aug. 28, 2014

(51) Int. Cl.
| | |
|---|---|
| *F28F 3/00* | (2006.01) |
| *F28F 9/00* | (2006.01) |
| *F28F 3/06* | (2006.01) |
| *B23P 15/26* | (2006.01) |
| *F28D 9/00* | (2006.01) |

(52) U.S. Cl.
CPC . *F28F 3/06* (2013.01); *B23P 15/26* (2013.01); *F28D 9/0025* (2013.01); *F28F 9/001* (2013.01); *Y10T 29/4935* (2015.01)

(58) Field of Classification Search
CPC ......... F28F 21/067; F28F 3/025; F28F 9/001; H05K 7/20136; F28D 9/0025; Y10S 165/394; B23P 15/26; Y10T 29/4935
USPC ...................................... 165/149, 165, 9, 166
See application file for complete search history.

(56) References Cited

U.S. PATENT DOCUMENTS

| | | | |
|---|---|---|---|
| 3,610,325 A | 10/1971 | Russell et al. | |
| 3,640,340 A * | 2/1972 | Leonard et al. | 165/166 |
| 3,907,050 A | 9/1975 | Mullings | |
| 4,352,227 A | 10/1982 | Ogata et al. | |
| 4,541,480 A | 9/1985 | Beckmann | |
| 5,036,906 A | 8/1991 | Rylewski | |
| 5,282,507 A * | 2/1994 | Tongu et al. | 165/165 |
| 5,826,327 A | 10/1998 | Koizumi et al. | |
| 6,006,430 A * | 12/1999 | Fukuoka et al. | 29/890.03 |
| 6,059,023 A | 5/2000 | Kurematsu | |
| 6,237,354 B1 | 5/2001 | Cromer | |
| 6,279,860 B1 | 8/2001 | Swanger | |
| 6,957,695 B2 | 10/2005 | Lomax, Jr. et al. | |
| 7,108,052 B2 * | 9/2006 | Giacoma et al. | 165/165 |

(Continued)

FOREIGN PATENT DOCUMENTS

| | | |
|---|---|---|
| DE | 10108185 A1 | 8/2002 |
| JP | 2002333295 A | 11/2002 |

(Continued)

OTHER PUBLICATIONS

U.S. Appl. No. 13/460,967, filed May 1, 2012, Moore.

(Continued)

*Primary Examiner* — Tho V Duong
(74) *Attorney, Agent, or Firm* — Sutherland Asbill & Brennan LLP

(57) ABSTRACT

The present application provides a heat exchanger assembly. The heat exchanger assembly may include a folded fin core with a ridge end and a trough end, a first end plate positioned about the ridge end of the folded fin core, a second end plate positioned about the trough end of the folded fin core, and with the first end plate and the second end plate including a number of protrusions thereon.

12 Claims, 5 Drawing Sheets

(56) References Cited

U.S. PATENT DOCUMENTS

| | | |
|---|---|---|
| 7,159,649 B2 * | 1/2007 | Thyrum et al. ............... 165/165 |
| 8,157,266 B2 | 4/2012 | Klisura et al. |
| 2005/0186066 A1 | 8/2005 | Phillip et al. |
| 2005/0199380 A1 | 9/2005 | Thyrum et al. |
| 2005/0280493 A1 | 12/2005 | Edmunds et al. |
| 2006/0048926 A1 * | 3/2006 | Richter ........................ 165/165 |
| 2008/0164014 A1 * | 7/2008 | Nakamura ................... 165/165 |
| 2009/0277606 A1 | 11/2009 | Reiss, III et al. |
| 2010/0018691 A1 | 1/2010 | Ohgami et al. |
| 2010/0071885 A1 * | 3/2010 | Chiang ........................ 165/149 |
| 2010/0128436 A1 | 5/2010 | Edmunds et al. |

FOREIGN PATENT DOCUMENTS

| | | |
|---|---|---|
| WO | 2008/119816 A1 | 10/2008 |
| WO | 2012/011681 A2 | 1/2012 |

OTHER PUBLICATIONS

U.S. Appl. No. 13/357,281, filed Jan. 24, 2012, Moore, et al.
European Search Report dated Jul. 13, 2015 for European Application No. EP 14156127.

* cited by examiner

HEAT EXCHANGER ASSEMBLY

TECHNICAL FIELD

The present application relates generally to a heat exchanger assembly and more particularly relates to a folded fin air to air heat exchanger assembly having end plates with a number of protrusions thereon.

BACKGROUND OF THE INVENTION

Many different types of heat exchanger designs are known for exchanging heat between two or more mediums. Moreover, certain types of heat exchangers are better suited for certain types of applications. For example, electronic control systems such as power plant control systems and the like may have relatively high operating temperatures given the use of high density electrical components. Air to air heat exchangers have been found to be effective in cooling such controls in an efficient manner.

One type of air-to-air heat exchanger is a folded fin heat exchanger. The folded fin heat exchanger may be formed by folding a continuous sheet of thermally conductive material so as to create a repeating "U-shaped" profile. Although such folded fin heat exchangers may provide efficient heat exchange, there may be issues in the assembly, joining, and handling of the various components within such a heat exchanger. Specifically, an outside fixture may be required for dip brazing or other types of flow based metal joining. The use of such fixtures may add cost and complexity to the manufacturing and assembly processes.

There is thus a desire for an improved heat exchanger assembly and a method of constructing the same. Specifically, there is a desire for an improved folded fin air to air heat exchanger with a simplified method of assembly and improved structural rigidity.

SUMMARY OF THE INVENTION

The present application and the resultant patent thus provide a heat exchanger assembly. The heat exchanger assembly may include a folded fin core with a ridge end and a trough end, a first end plate positioned about the ridge end of the folded fin core, a second end plate positioned about the trough end of the folded fin core, and with the first end plate and the second end plate including a number of protrusions thereon.

The present application and the resultant patent further provide a method of assembling a heat exchanger assembly. The method may include the steps of positioning a first end plate with a first number of protrusions about a ridge end of a fold fin core, positioning a first side plate into a first side last protrusion on the first end plate, positioning a second side plate into a second side last protrusion on the first end plate, positioning a second end plate with a second number of protrusions about a trough end of the folded fin core, the first side plate, and the second side plate, and joining the folded fin core, the first end plate, the second end plate, the first side plate, and the second side plate in a flow based metal joining process.

The present application and the resultant patent further provide an air to air heat exchanger assembly. The air to air heat exchanger may include a folded fin core with a number of fin walls with a number of ridges and a number of troughs therebetween, a ridge end, and a trough end, a first end plate positioned about the ridge end of the folded fin core, and a second end plate positioned about the trough end of the folded fin core. The first end plate and the second end plate both include a number of protrusions thereon to accommodate the ridges and the troughs of the folded fin core thereabout.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
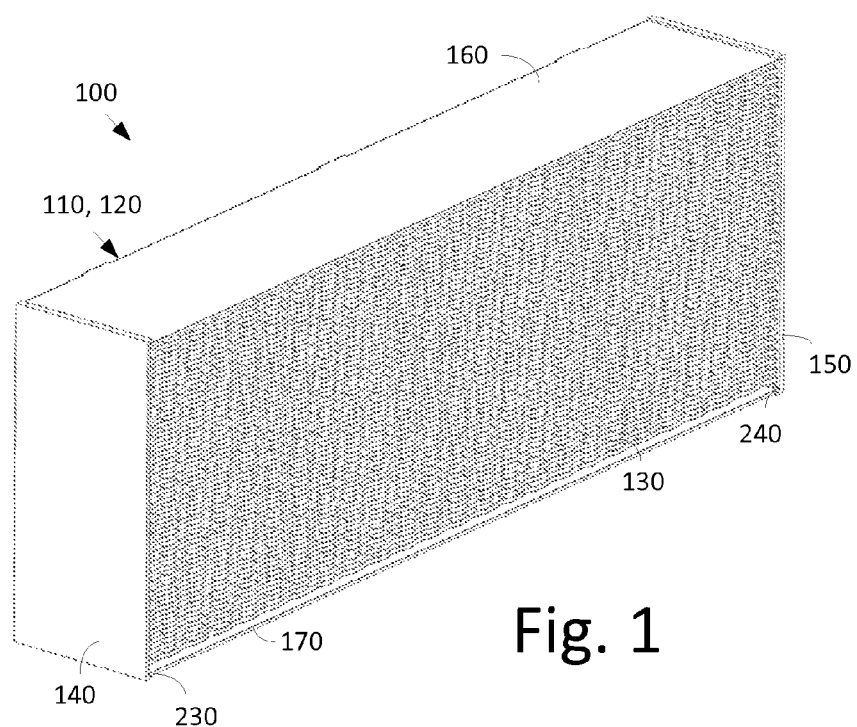
FIG. 1 is a perspective view of a heat exchanger assembly as may be described herein.
Figure 2:
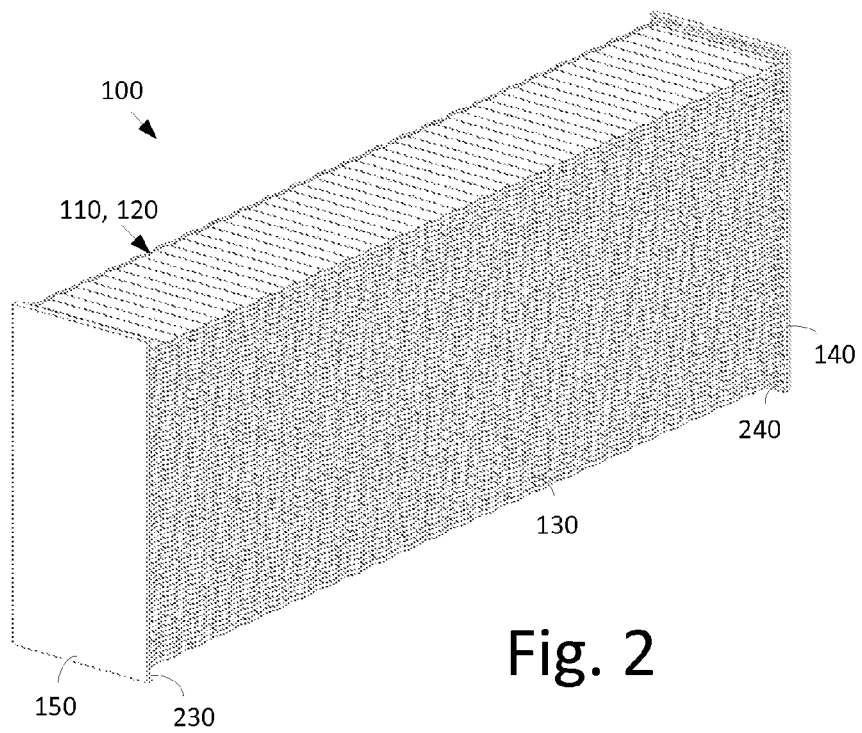
FIG. 2 is a further perspective view of the heat exchanger assembly of FIG. 1.

Referring now to the drawings, in which like numerals refer to like elements throughout the several views, FIGS. 1 and 2 show a heat exchanger assembly 100 as may be described herein. In this example, the heat exchanger assembly 100 may be an air-to-air exchanger 110, and more specifically, a folded fin air to air heat exchanger 120. Other types of heat exchanger assemblies 100 may be used herein. The heat exchanger assembly 100 may have any size, shape, or configuration.

The heat exchanger assembly 100 may include a folded fin core 130. The folded fin core 130 may be enclosed in part by a first end plate 140, a second end plate 150, a first side plate 160, and a second side plate 170. The combination of the elements herein may provide a fluid-tight barrier between the opposite sides of the exposed area of the folded fin core 130. The individual components of the heat exchanger assembly 100 may have any size, shape, or configuration. Other types of components also may be used herein.

Figure 3:
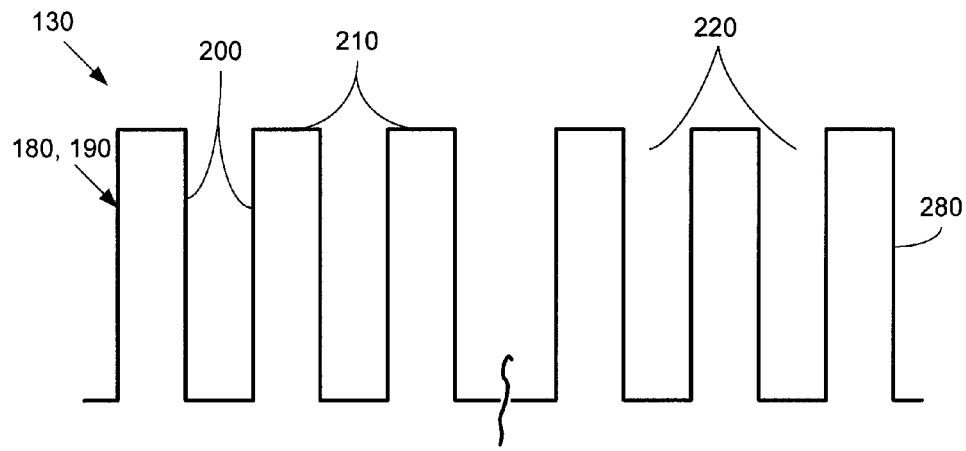
FIG. 3 is a side plan view of a folded fin core for use with the heat exchanger assembly of FIG. 1.

FIG. 3 shows an exaggerated view of the folded fin core 130. The folded fin core 130 may be made from a continuous sheet 180 of a thermally conductive material 190. The thermally conductive material 190 may be aluminum, an aluminum based alloy, or other types of materials with good heat transfer and structural characteristics. The continuous sheet 180 may be folded so as to form any number of substantially parallel fin walls 200. The fin walls 200 may be spaced apart from one another by alternating flat ridges 210 and troughs 220. Each pair of fin walls 200 may be spaced apart by the flat ridges 210 to form each trough 220 for a repeating "U-shape". The folded fin core 130 may have any size, shape, or configuration. As will be explained in more detail below, the folded fin core 130 may extend from a first end or a ridge end 230 to a second end or a trough end 240.

Figure 4:
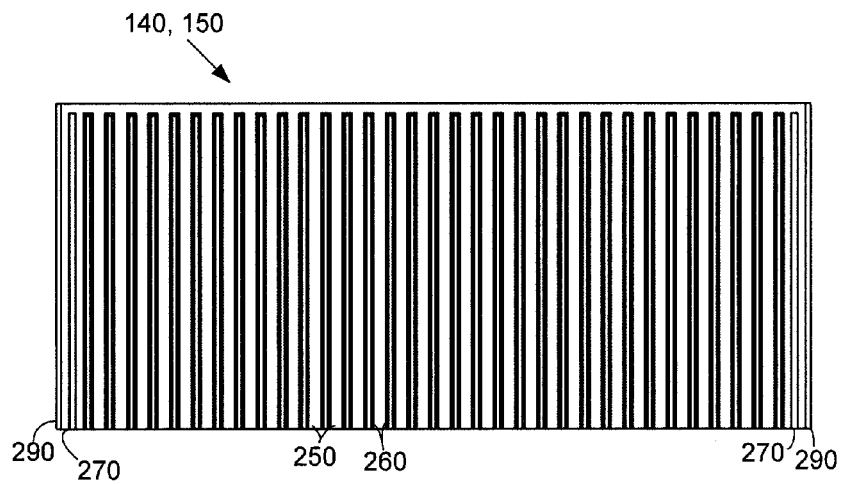
FIG. 4 is a top plan view of an end plate that may be used with the exchanger assembly of FIG. 1.
Figure 5:
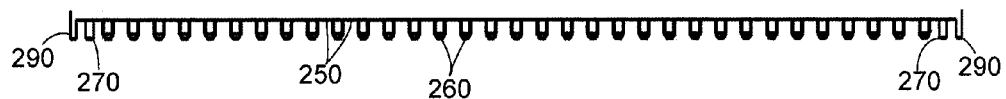
FIG. 5 is a side plan view of the end plate of FIG. 4.
Figure 6:
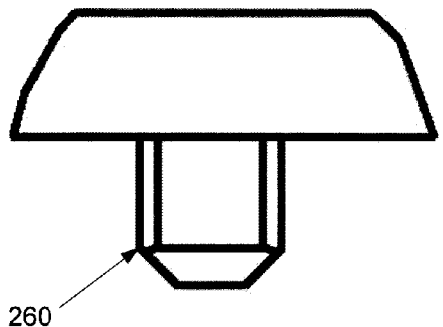
FIG. 6 is a side plan view of a protrusion on the end plate of FIG. 4.
Figure 7:
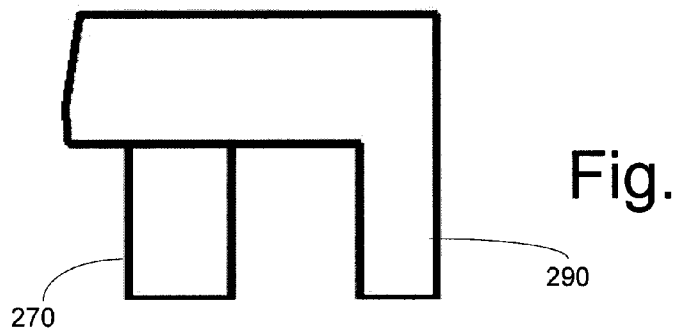
FIG. 7 is a side view of a second to last protrusion and a last protrusion on the end plate of FIG. 4.

FIGS. 4 and 5 show an example of one of the end plates 140, 150. The first end plate 140 and the second end plate 150 may be substantially identical and need not be described separately. Each end plate 140, 150 may include a flat surface 250 with a number of protrusions 260 extending therefrom. The protrusions 260 may conform to the shape and the fin pitch of the fin walls 200 of the folded fin core 130. An example of one of the protrusions 260 is shown in FIG. 6. Any number of the protrusions 260 may be used herein. A second to last protrusion 270 on both ends of the end plates 140, 150 may be sized to accommodate an outer one-half folded fin 280 of the folded fin core 130. A last protrusion 290 on both sides of the end plate 140, 150 may be sized to accommodate the side plates 160, 170 therein. FIG. 7 shows an example of the second to last protrusion 270 and the last protrusion 290. Other components and other configurations may be used herein.

Figure 8:
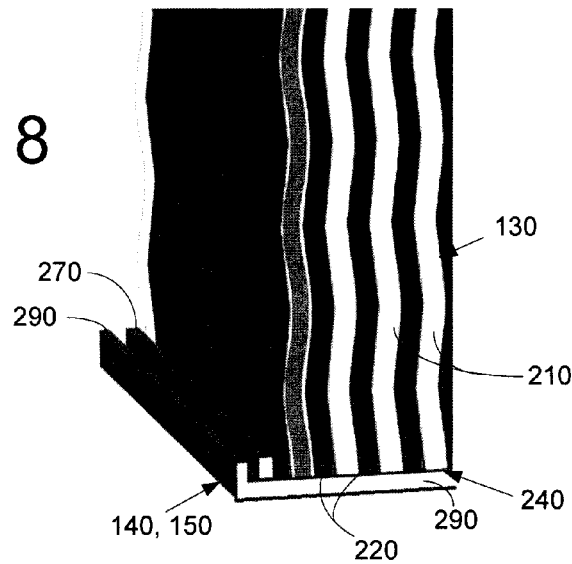
FIG. 8 is a perspective view of a ridge end of the heat exchanger assembly of FIG. 1.
Figure 9:
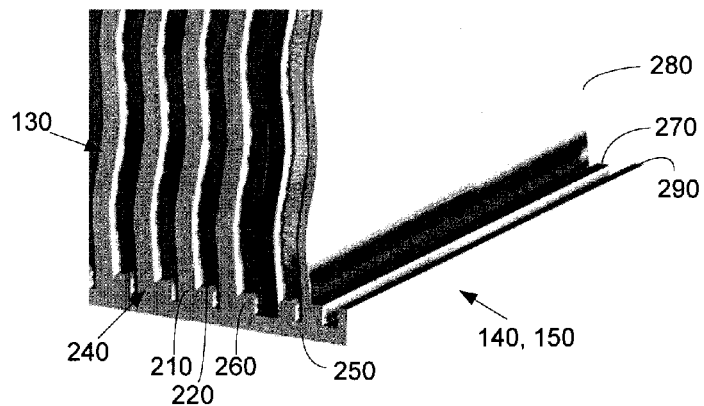
FIG. 9 is a perspective view of a trough end of the heat exchanger assembly of FIG. 1.
Figure 10:
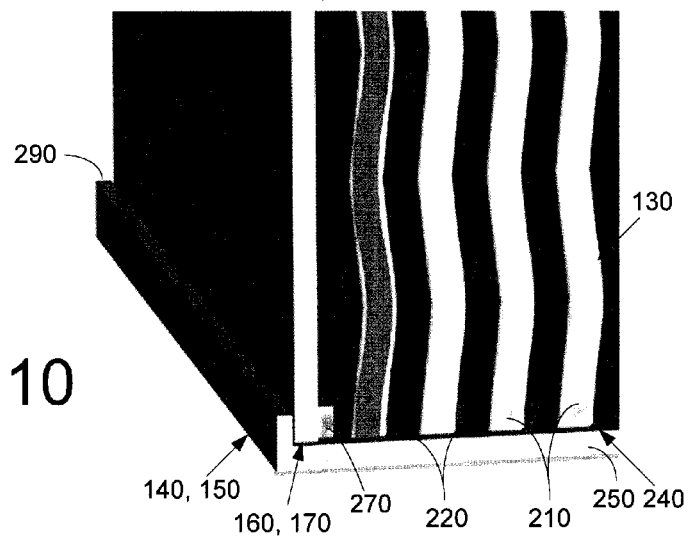
FIG. 10 is a perspective view of the ridge end of the heat exchanger assembly of FIG. 1 with a side plate.

FIG. 8 shows the ridge end 230 of the folded fin core 130 positioned about the first end plate 140. FIG. 9 shows the trough end 240 of the folded fin core 130 positioned about the second end plate 150. As is shown in this example, the troughs 220 and the fin walls 200 are sized to envelope the protrusions 260 in the ridge end 230. Likewise, the troughs 220 expose the protrusions 260 in the trough end 240 while the ridges 210 fill the spaces between the protrusions 260. FIG. 10 shows the addition of the side plates 160, 170 in the last protrusions 290 of the end plates 140, 150. The side plates 160, 170 add further mechanical support to the heat exchanger assembly 100 as a whole. Other components and other configurations may be used herein.

In use, the end plates 140, 150 may be positioned about the folded fin core 130. Specifically, the ridge end 230 and the trough end 240 may be positioned within and adjacent to the protrusions 260 on the end plates 140. Likewise, the side plates 160, 170 may be positioned within the last protrusions 290 of the end plates 140, 150. This configuration provides structural rigidity to the heat exchanger assembly 100 for handling before the components are joined. Moreover, a separate fixture or jigging may not be required for the bonding process. Specifically, the fin walls 200 and the protrusions 260 may be spaced with sufficient clearance for adequate metal bonding flux flow and bonding filler material for dip brazing or other types of flow based metal joining while providing physical rigidity before and during the bonding process. Other types of metal joining means may be used herein.

Overall structural rigidity during assembly is further improved by the size of the second to last protrusions 270 for use with the outer one half folded fins 280. Likewise, the sidewalls 160, 170 provide further mechanical support and sealing without being directly joined to the folded fin core 130. Moreover, the bonding process provides a good mechanical seal so as to provide a physical, airtight barrier for efficient overall operation.

The heat exchanger assembly 100 thus provides self-fixturing or self-jigging prior to the metal joining process and provides structural rigidity after the bonding process. The heat exchanger assembly 100 also provides means of sealing the end plates for a physical, airtight barrier for sealed heat exchanger operations. Moreover, the bonding process causes higher yield production quality parts. The heat exchanger assembly 100 thus provides efficient heat exchange with an overall simplified manufacturing process.

Figure 11:
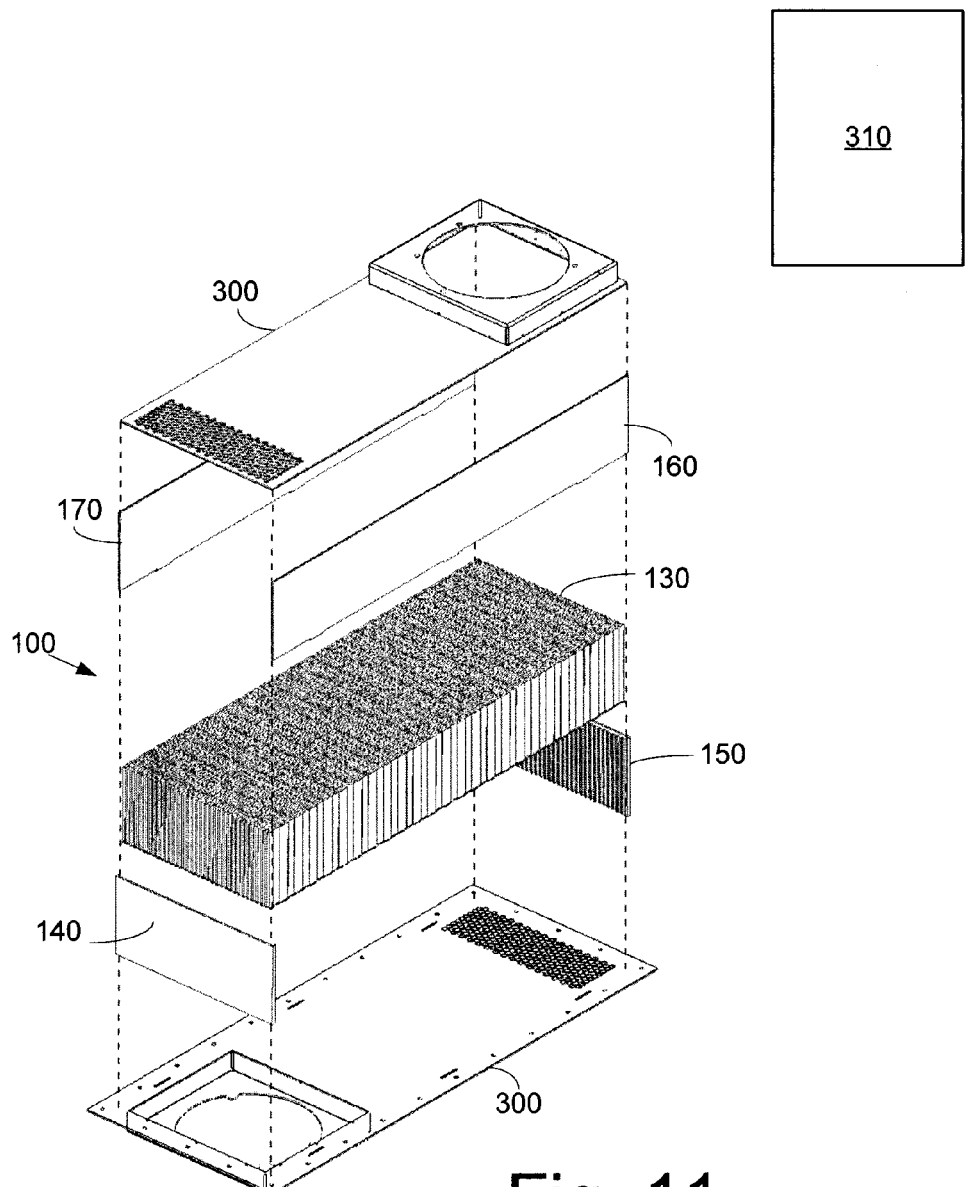
FIG. 11 is an exploded view of the heat exchanger assembly of FIG. 1 with a pair of fan plenums.

The heat exchanger assembly 100 may have many different applications. For example, FIG. 11 shows the use of the heat exchanger assembly 100 with a pair of fan plenums 100 to force a flow of air therethrough. The heat exchanger assembly 100 with the fan plenums 300 or other types of devices may be used to cool a component 310, such as an electrical, heat generating component and the like. Many other applications may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A heat exchanger assembly, comprising:
    a folded fin core;
    wherein the folded fin core comprises a ridge end and a trough end, and wherein the folded fin core comprises a first one half folded fin at the ridge end and a second one half folded fin at the trough end;
    a first end plate positioned about the ridge end of the folded fin core;
    a second end plate positioned about the trough end of the folded fin core; and
    wherein the first end plate and the second end plate comprise a plurality of protrusions thereon, and wherein the first end plate and the second end plate comprise a first side second to last protrusion sized to accommodate the first one half folded fins and a second side second to last protrusion sized to accommodate the second one half folded fins.

2. The heat exchanger assembly of claim 1, wherein the folded fin core comprises a continuous sheet of a thermally conductive material.

3. The heat exchanger assembly of claim 1, wherein the folded fin core comprises a plurality of fin walls.

4. The heat exchanger assembly of claim 3, wherein the plurality of fin walls comprises a plurality of ridges and a plurality of troughs therebetween.

5. The heat exchanger assembly of claim 1, wherein the first end plate and the second end plate comprise a flat plate with the plurality of protrusions thereon.

6. The heat exchanger assembly of claim 1, further comprising a first side plate and a second side plate extending from the first end plate to the second end plate.

7. The heat exchanger assembly of claim 6, wherein the first end plate and the second end plate comprise a first side last protrusion sized to accommodate the first side plate and a second side last protrusion sized to accommodate the second side plate.

8. The heat exchanger assembly of claim 1, further comprising a fan plenum positioned about the folded fin core.

9. The heat exchanger assembly of claim 1, wherein the heat exchanger assembly comprises an air to air heat exchanger.

10. An air to air heat exchanger assembly, comprising:
    a folded fin core;
    the folded fin core comprising a plurality of fin walls with a plurality of ridges and a plurality of troughs therebetween;
    the folded fin core comprising a ridge end and a trough end, wherein the folded fin core comprises a first one half folded fin at the trough end and a second one half folded fin at the ridge end;
    a first end plate positioned about the ridge end of the folded fin core;
    a second end plate positioned about the trough end of the folded fin core; and
    wherein the first end plate and the second end plate comprise a plurality of protrusions thereon to accommodate the plurality of ridges and the plurality of troughs of the folded fin core, and wherein the first end plate and the second end plate comprise a first side second to last protrusion sized to accommodate the first one half folded fins and a second side second to last protrusion sized to accommodate the second one half folded fins.

11. The air to air heat exchanger assembly of claim 10, further comprising a first side plate and a second side plate extending from the first end plate to the second end plate so as to provide a fluid tight barrier.

12. The air to air heat exchanger assembly of claim 11, wherein the first end plate and the second end plate comprise a first side last protrusion sized to accommodate the first side plate and a second side last protrusion sized to accommodate the second side plate.

* * * * *